United States Patent
Nitta

(10) Patent No.: US 6,580,698 B1
(45) Date of Patent: Jun. 17, 2003

(54) PATH SETTING METHOD IN A MOBILE PACKET COMMUNICATION SYSTEM

(75) Inventor: Yoshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/382,641

(22) Filed: Aug. 25, 1999

(30) Foreign Application Priority Data

Aug. 27, 1998 (JP) .......................................... 10-241555

(51) Int. Cl.⁷ ................................................ H04Q 7/00
(52) U.S. Cl. ...................... 370/328; 370/218; 370/331; 370/351; 455/436; 455/432
(58) Field of Search ................................ 370/217–228, 370/248, 316, 328, 329, 331, 340, 341, 351, 352, 466; 455/436, 437, 438, 439, 444, 450, 464, 432, 466

(56) References Cited

U.S. PATENT DOCUMENTS

| | | | | |
|---|---|---|---|---|
| 4,989,204 A | * | 1/1991 | Shimizu et al. ............. | 370/328 |
| 5,278,892 A | * | 1/1994 | Bolliger et al. ............. | 370/331 |
| 5,548,586 A | * | 8/1996 | Kito et al. .................. | 370/349 |
| 6,246,669 B1 | * | 6/2001 | Chevalier et al. ........... | 370/238 |
| 2002/0048266 A1 | * | 4/2002 | Choi et al. .................. | 370/331 |

FOREIGN PATENT DOCUMENTS

| | | |
|---|---|---|
| EP | 0 661 895 | 12/1994 |
| JP | 1-246937 | 10/1989 |
| JP | 2-15722 | 1/1990 |
| JP | 8-46643 | 2/1996 |
| JP | 8-186605 | 7/1996 |
| JP | 10-136439 | 5/1998 |
| JP | 10-145425 | 5/1998 |
| WO | WO 95/08897 | 3/1995 |
| WO | WO 95/08898 | 3/1995 |
| WO | WO 95/08899 | 3/1995 |
| WO | WO 95/20865 | 8/1995 |

OTHER PUBLICATIONS

Onuki, C.; "Summary of Compilation 1 of Mobile Packet Communication System"; NTT DoCoMo Technical Journal; vol. 5, No. 2, pp. 6–9 (1–5); Electrical Communication Association, Inc.; Jul. 1, 1997. (Reference to Fig. 3 and 4); "Protocol Construction".

Hirata, S.; "Summary of Compilation 3 of Mobile Packet Communication System; Network Architecture"; NTT DoCoMo Technical Journal; vol. 5, No. 2, pp. 16–20 (1–5); Electrical Communication Association, Inc.; Jul. 1, 1997. (Reference entire text and all Drawings).

(List continued on next page.)

*Primary Examiner*—Nay Maung
*Assistant Examiner*—Sonny Trinh
(74) *Attorney, Agent, or Firm*—McGinn & Gibb, PLLC

(57) ABSTRACT

A path setting method for securing packet communication when a mobile packet terminal is roaming across radio zones in a mobile packet communication system is provided. In a mobile packet communication system there is provided a mobile packet terminal, and a plurality of radio zones are specified. Also, base stations for performing packet communications by using mobile packet terminals and radio links in each of the radio zones, mobile network exchanges connected to the base stations, and radio terminators connected to the mobile network exchanges and terminate a radio section protocol to connect to an external communication network are provided in the mobile packet communication system. The mobile network exchanges are connected to each other. Each of the radio terminators control a path setting from the base station in the radio zone in which the mobile packet terminal is located to either of the radio terminators according to the packet communication state, which is an active state or a dormant state, of the mobile packet terminal when the mobile packet terminal roams across the radio zones.

3 Claims, 8 Drawing Sheets

OTHER PUBLICATIONS

Japanese Office Action dated May 14, 2002, with partial English translation.

1995 Conference of the Electronic Information Communication Association B–5–214 (Mar. 6, 1998), p. 578 (1–2).

1995 Conference of the Electronic Information Communication Association SSE–92–67 (Sep. 19, 1992), pp. 85–90 (1–8).

Swedish Office Action dated Jan. 10, 2003 with English Translation.

* cited by examiner

PATH SETTING METHOD IN A MOBILE PACKET COMMUNICATION SYSTEM

BACKGROUND OF THE INVENTION

1. Field of the Invention

The present invention relates to a mobile packet communication system and a path setting method in a mobile packet communication network in which a mobile packet terminal moves through different radio zones.

2. Description of the Related Art

FIG. 8 is a conceptual drawing for explaining a conventional mobile packet communication system in which a mobile packet terminal moves from one radio zone to another. Referring to FIG. 8, the following outlines mobile packet communications in the conventional mobile packet communication system.

It is assumed that the mobile packet communication system in the figure has a mobile radio communication network 86, which is connected to an external communication network 85. In the shown example, the mobile radio communication network 86 is provided with a plurality of radio zones 81 and 82 by respective base stations 87 and 88. The base station 87 is connected to a mobile network exchange 89, which is connected to an external communication network 85 via a radio terminator 83. Similarly, the base station 88 is connected to a mobile network exchange 90, which is connected to the external communication network 85 via a radio terminator 84.

Suppose that a mobile packet terminal 80 roams from the radio zone 81 to the radio zone 82. When the mobile packet terminal 80 is not present in the radio zone 81, the base station 87 notifies the mobile network exchange 89 of the information (mobile packet terminal absence information). In response to the mobile packet terminal absence information, the mobile network exchange 89 disconnects the path connecting the external communication network 85 and the mobile packet terminal 80.

On the other hand, when the mobile packet terminal 80 appears in the radio zone 82, the base station 88 recognizes the mobile packet terminal 80 and notifies the mobile network exchange 90 of the information (mobile packet terminal appearance information). In response to the mobile packet terminal appearance information, the mobile network exchange 90 establishes a path connecting the external communication network 85 and the mobile packet terminal 80.

By the way, in a conventional mobile packet communication system, there exists a problem that packet communications are disabled from the time the previous path is disconnected until a new path is established, if, for example, a mobile packet terminal is performing packet communications actively when the mobile packet terminal is moving across radio zones.

An object of the present invention is to provide a mobile packet communication system which can perform secure packet communications even when the mobile packet terminal is moving across radio zones.

SUMMARY OF THE INVENTION

According to the present invention, there is provided a path setting method in mobile packet communications wherein at least one mobile packet terminal is provided, and a plurality of radio zones are specified, and repeater sections corresponding to the radio zones are provided for connecting an external communication network and the radio zones, each of the repeater sections comprises base stations for performing packet communications by using the mobile packet terminals and radio links, mobile network exchanges connected to the base stations, and radio terminators connected to the mobile network exchange and which terminate a radio section protocol to connect to the external communication network, the path setting method being characterized in that the mobile network exchanges are connected to each other and each of the radio terminators controls setting a path from the base station in the radio zone in which the mobile packet terminal is located to either of the radio terminators according to the packet communication state of the mobile packet terminal when the mobile packet terminal roams across the radio zones.

For example, when the mobile packet terminal roams in the active state from the first radio zone to the second radio zone, the radio terminator corresponding to the first radio zone controls the mobile network exchange in the first radio zone to set a path across the mobile network exchange in the first radio zone and the mobile network exchange in the second radio zone and to establish a path connection across the mobile packet terminal and the radio terminator corresponding to the first radio zone.

Also, when the mobile packet terminal roams in the dormant state from the first radio zone to the second radio zone, the radio terminator corresponding to the first radio zone controls the mobile network exchange in the first radio zone to disconnect the path connecting the mobile network exchange in the first radio zone and the base station in the first radio zone and controls the mobile network exchange in the second radio zone to set a path across the mobile packet terminal and the radio terminator corresponding to the second radio zone.

Moreover, when the mobile packet terminal roams in the active state from the first radio zone to the second radio zone and the mobile packet terminal makes transition to the dormant state, the radio terminator corresponding to the first radio zone, recognizing the active state, controls the mobile network exchange in the first radio zone to set a path across the mobile network exchange in the first radio zone and the mobile network exchange in the second radio zone and to establish a path connection across the mobile packet terminal and the radio terminator corresponding to the first radio zone, and the radio terminator, recognizing the dormant state, controls the mobile network exchange in the first radio zone to disconnect the path connecting the mobile network exchange in the first radio zone and the base station in the first radio zone and controls the mobile network exchange in the second radio zone to set a path across the mobile packet terminal and the radio terminator corresponding to the second radio zone.

Further, when the mobile packet terminal roams from the first radio zone to the second radio zone, the radio terminator corresponding to the first radio zone may control the mobile network exchange in the first radio zone to set a path across the mobile network exchange in the first radio zone and the mobile network exchange in the second radio zone and to establish a path connection across the mobile packet terminal and the radio terminator corresponding to the first radio zone, and after that, the radio terminator may supervise packet communication state of the mobile packet terminal to judge whether or not the packet communication state of the mobile packet terminal is the dormant state, and if the packet communication state of the mobile packet terminal is the dormant state, the radio terminator may control the mobile network exchange in the first radio zone to disconnect the path connecting the mobile network exchange in the first radio zone and the base station in the first radio zone and control the mobile network exchange in the second radio zone to set a path across the mobile packet terminal and the radio terminator corresponding to the second radio zone.

DETAILED DESCRIPTION OF THE PREFERRED EMBODIMENTS

The present invention will be explained referring to attached drawings.

Figure 1:
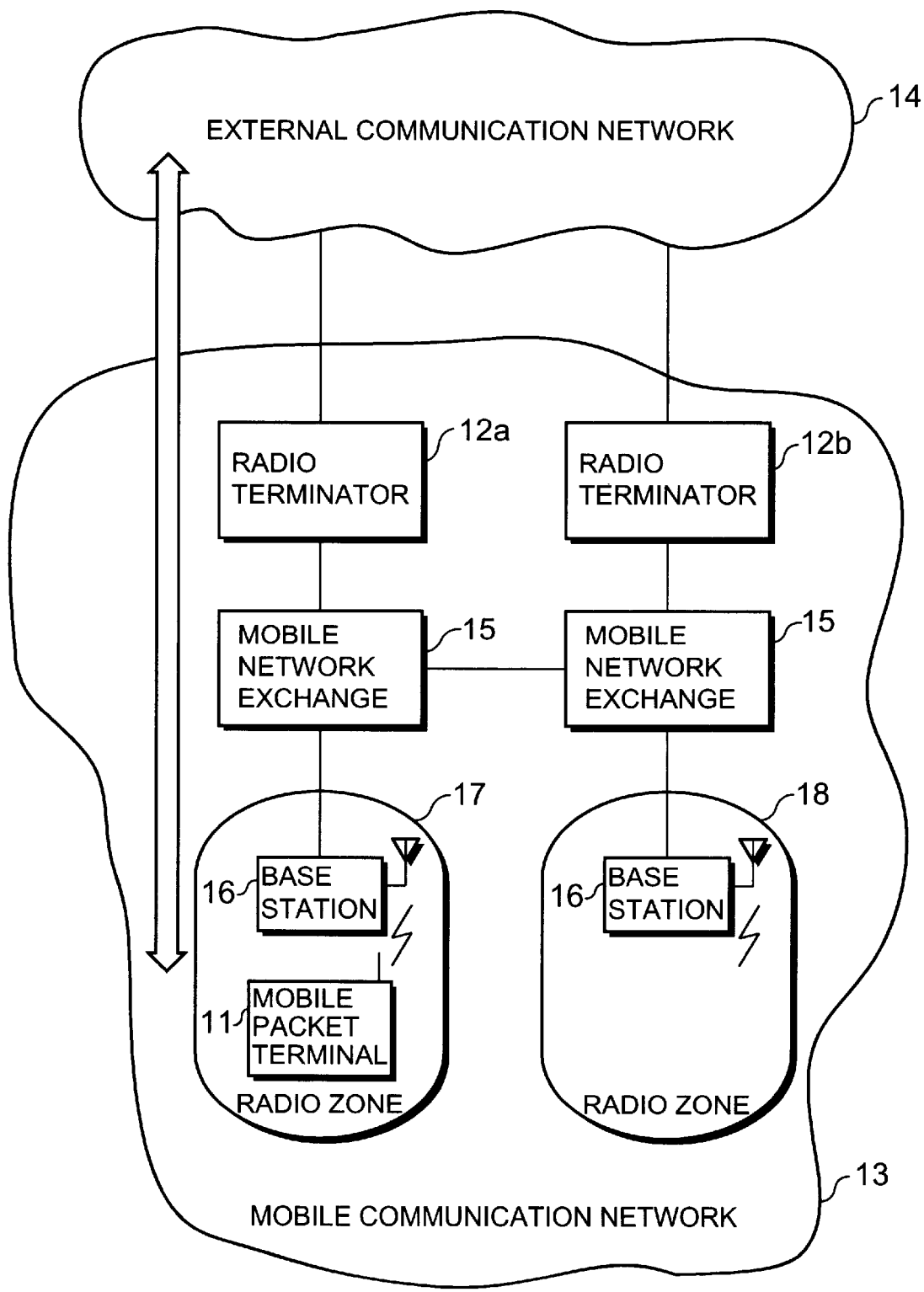
FIG. 1 shows a block diagram of the mobile communication network for explaining a path setting control according to the present invention.

First, referring to FIG. 1, the mobile packet communications system comprises a mobile communication network 13, and in the shown example, the mobile communication network 13 comprises a plurality of radio zones 17,18. In the mobile communication network 13, a plurality of base stations 16 are installed and disposed, and each of the base stations 16 is connected to a mobile network exchange 15, which is connected to an external communication network 14 via a radio terminator 12. That is, the radio terminator 12 has a feature which terminates the radio section protocol set to implement packet communications with a mobile packet terminal 11 to establish connection from the mobile communication network 13 to the external communication network 14. Pairs of base stations, mobile network exchanges, and radio terminators may be referred to as a repeater section. The mobile network exchanges are connected to each other.

Figure 2:
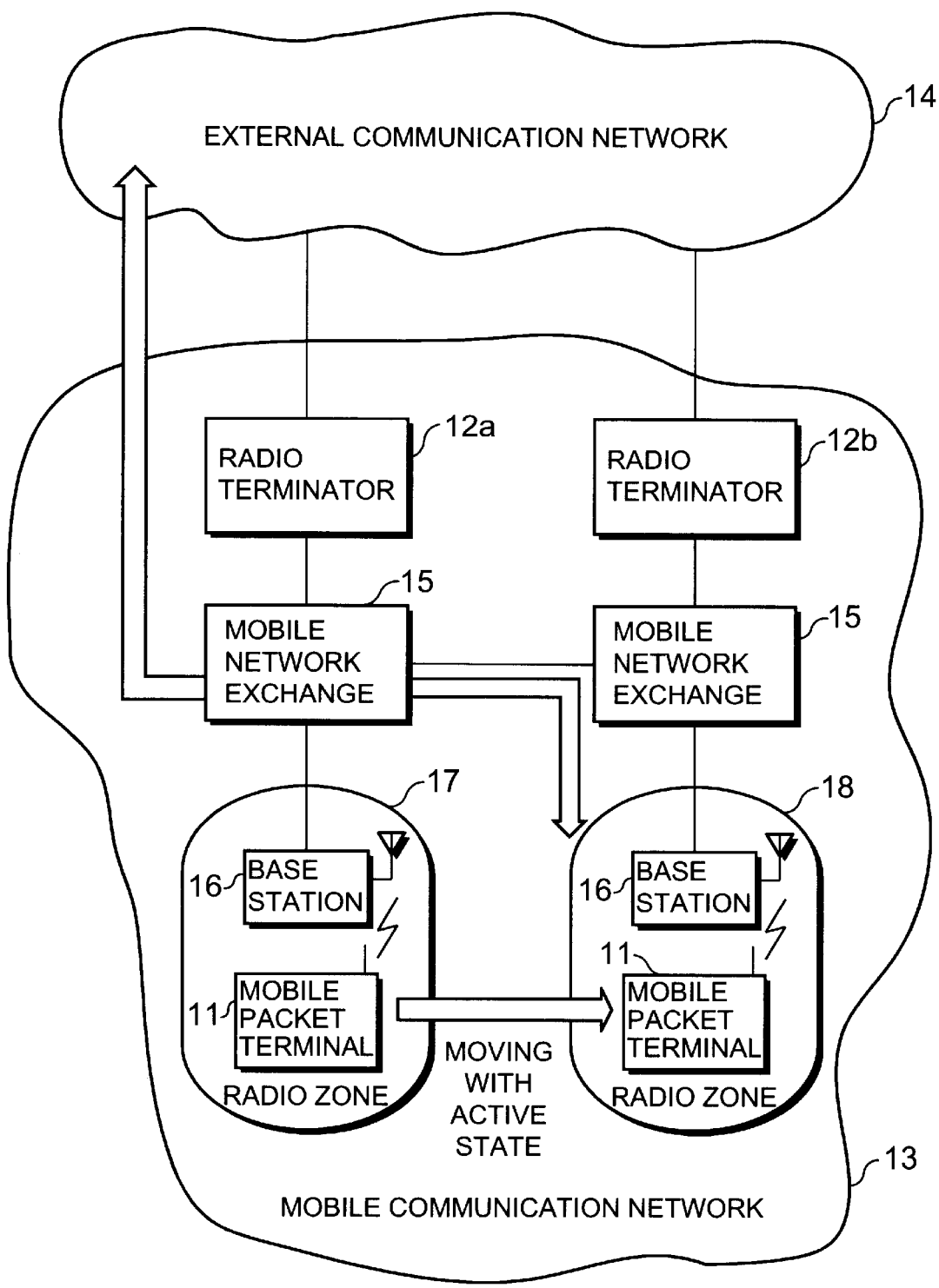
FIG. 2 shows a block diagram of the mobile communication network for explaining a path setting state assuming a mobile packet terminal being roamed in the active state across radio zones.

Referring to FIG. 2, suppose that the mobile packet terminal 11 has roamed in the active state from a radio zone 17 to a radio zone 18. Suppose that, in the shown example, radio terminators 12a and 12b are deployed for the radio zones 17 and 18, respectively. When the mobile packet terminal 11 has roamed in the active state, (a state where packet communications are actively under way), from the radio zone 17 to the radio zone 18, the radio terminator 12a used as a radio terminator from onset is used also in the roaming destination.

Figure 3:
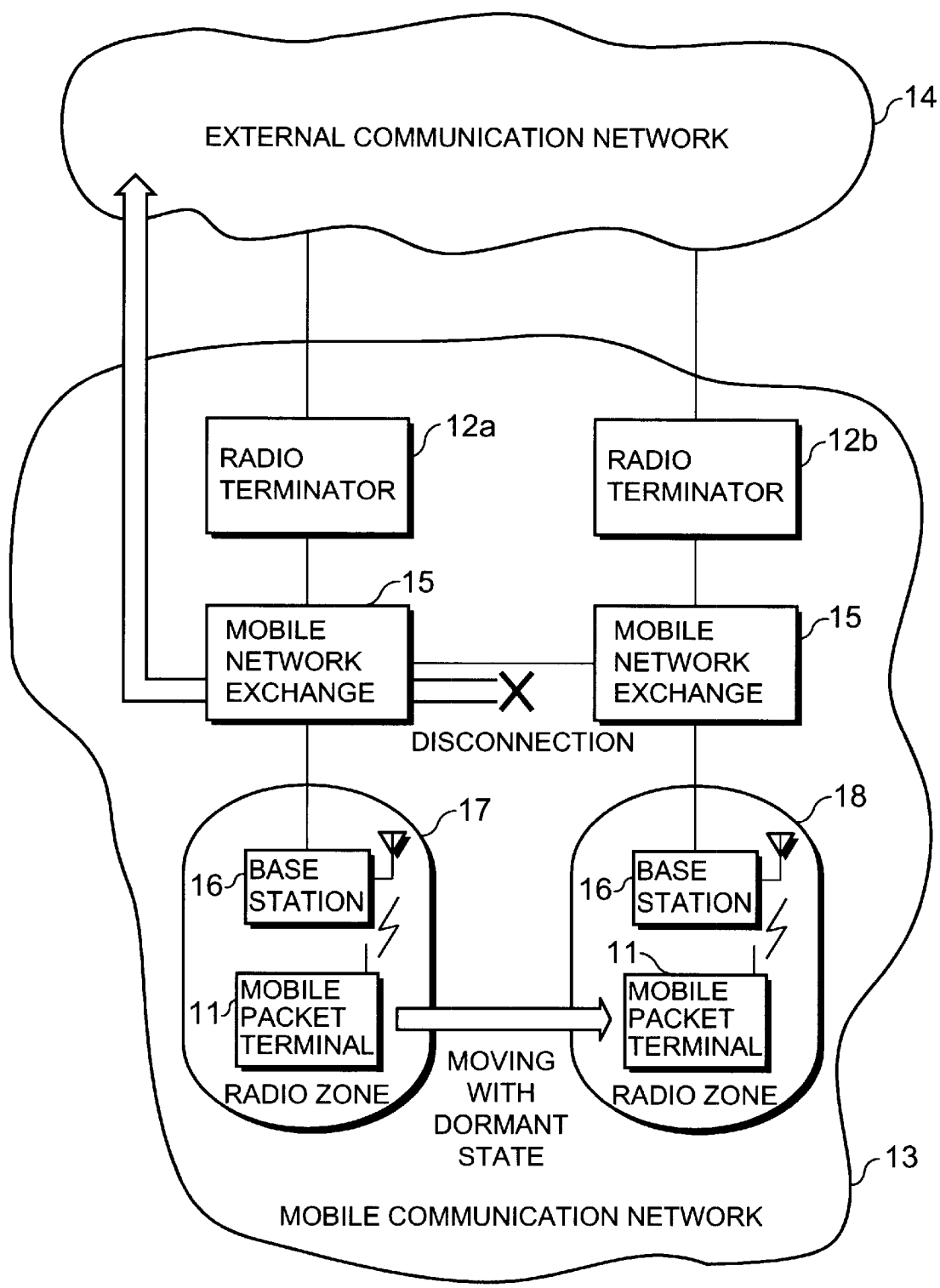
FIG. 3 shows a block diagram of the mobile communication network for explaining a path setting state assuming a mobile packet terminal being roamed in the dormant state across radio zones.

Referring to FIG. 3, suppose that the mobile packet terminal 11 has roamed in the dormant state from the radio zone 17 to the radio zone 18. When the mobile packet terminal 11 has roamed in the dormant state, or a state where logical link is established but packet communications are not under way, from the radio zone 17 to the radio zone 18, the radio terminator 12a used as a radio terminator from onset is not used in the roaming destination but disconnected from the radio terminal 11 and the radio terminator 12b is connected anew to the mobile packet terminal 11.

Figure 4:
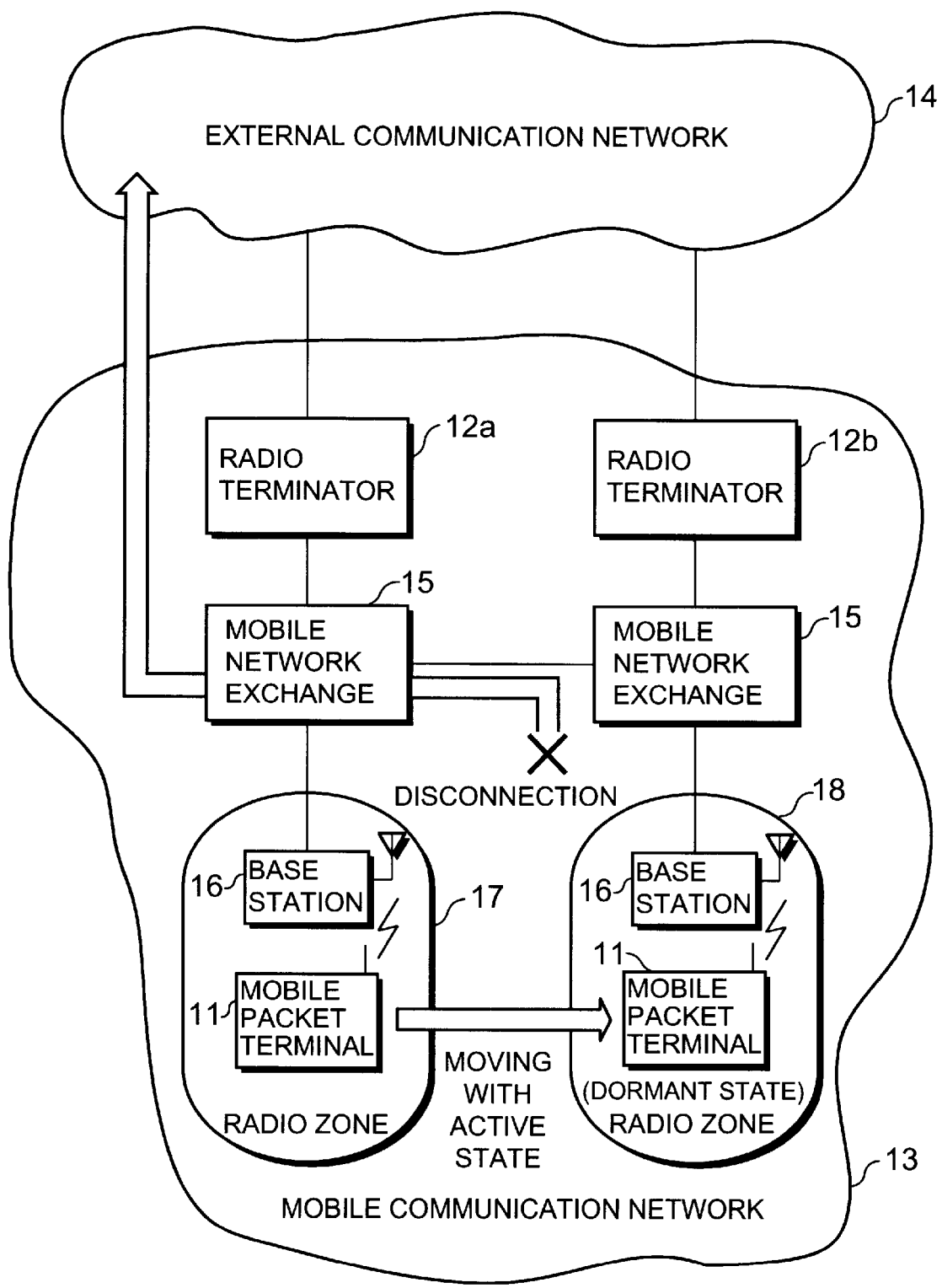
FIG. 4 shows a block diagram of the mobile communication network for explaining a path setting state assuming a mobile packet terminal being roamed in the active state across radio zones and changed into the dormant state.

Referring to FIG. 4, suppose that the mobile packet terminal 11 has roamed in the active state from the radio zone 17 to the radio zone 18 then the mobile packet terminal 11 has made transition to the dormant state. If he mobile packet terminal 11 has roamed in the active state from the radio zone 17 to the radio zone 18, it uses at the roaming destination the radio terminator 12a used as a radio terminator from onset. In this example, because the mobile packet terminal 11 has made transition from the active state to the dormant state after it has roamed from the radio zone 17 to the radio zone 18, the radio terminator 12a is disconnected from the mobile packet terminal 11 and the radio terminator 12b which is the nearest radio terminator is connected to the mobile packet terminal 11.

As mentioned above, when packet communication state is the active state, connection between the mobile packet terminal and the current radio terminator is maintained without the radio terminator being changed even if the mobile packet terminal roams across the radio zone. When the packet communications have entered the dormant state, a path is established anew from the mobile packet terminal to the nearest radio terminator corresponding to the radio zone in which the mobile packet terminal is located. Thus loss of packets transmitted in packet communications in the active state can be reduced.

Figure 5:
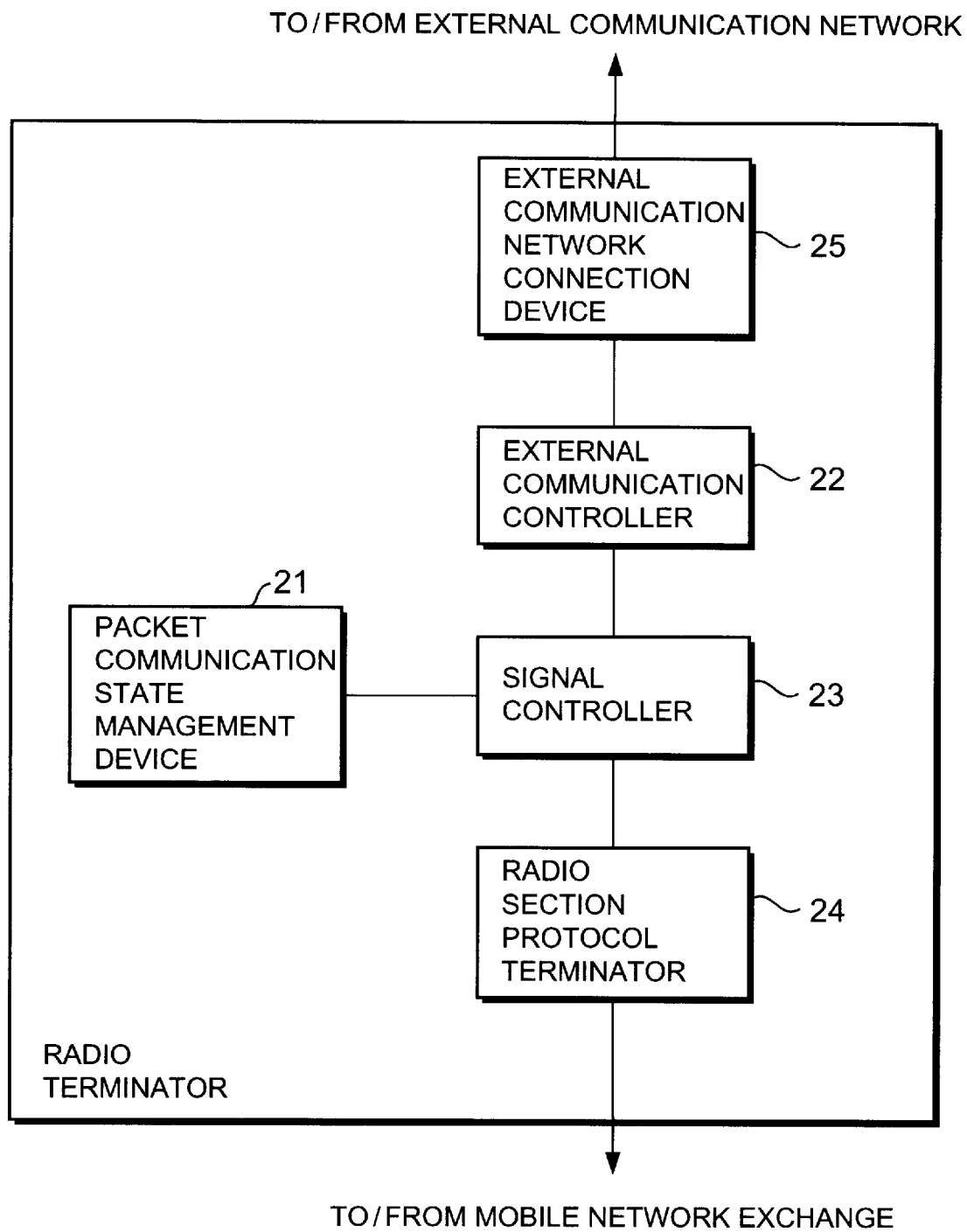
FIG. 5 shows the configuration of the radio terminator shown in FIG. 1.

Here, referring to FIG. 5, radio terminators 12a and 12b comprise a packet communication state management device 21, an external communication controller 22, a signal controller 23, a radio section protocol terminator 24, and an external communication network connection device 25. The radio section protocol terminator 24 includes the connection interface with the mobile network exchange 15 and the connection interface terminates the radio section protocol in the radio section protocol terminator 24.

The external communication network connection device 25 is a communication device for establishing connection with the external communication network 14. When the external communication network is the Internet, a router is used as the external communication network connection device 25. The external communication controller 22 is positioned between the external communication network connection device 25 and the signal controller 23 in order to relay and connect control signals and data signals. The signal controller 23 is positioned at the center of the control signal and data signal streams and, in particular, controls distribution of control signals. The packet communication state management device 21 manages and supervises the packet communication state of respective packet to transmit/receive control signals required for path setting.

Figure 6:
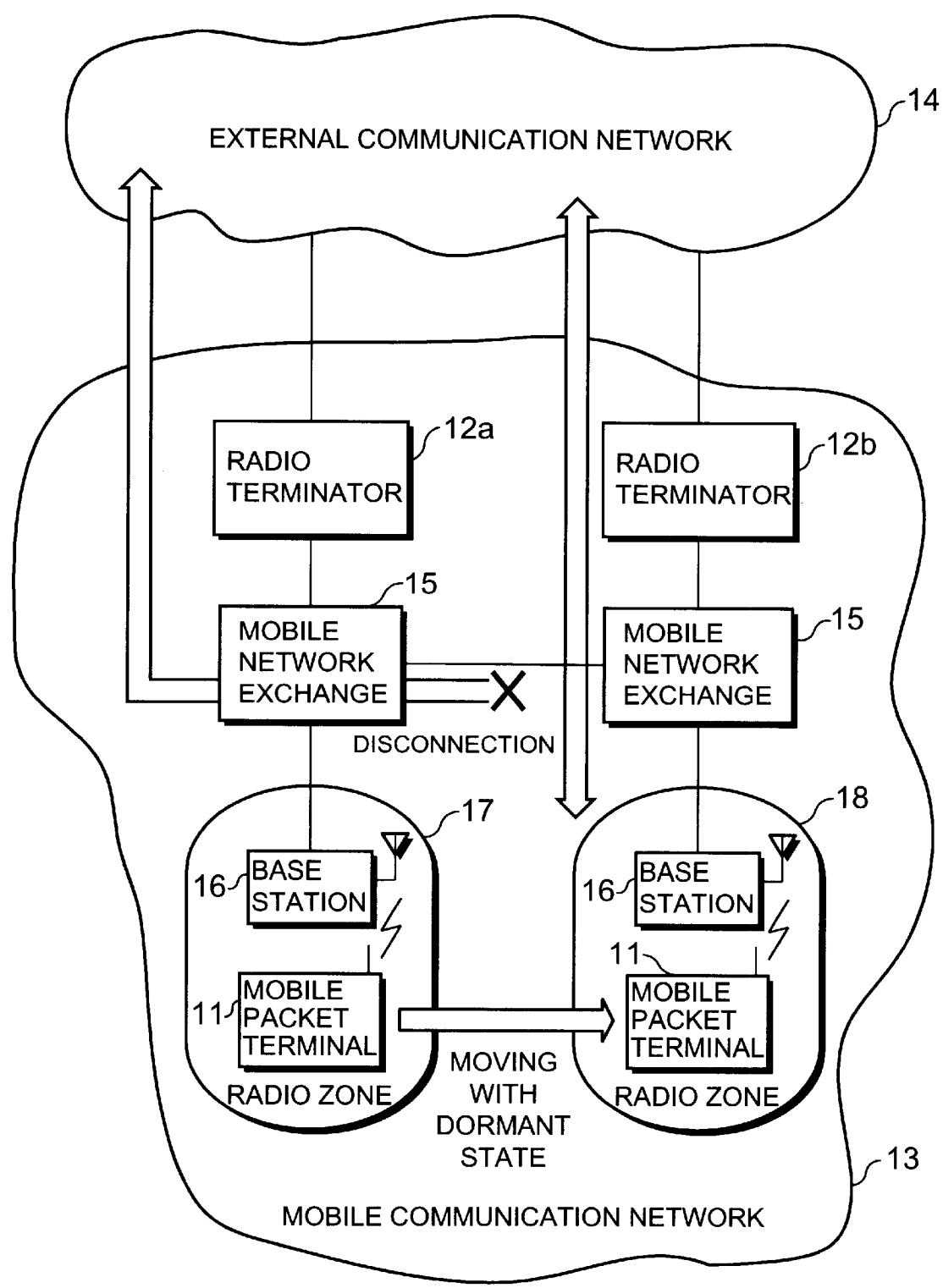
FIG. 6 shows a block diagram of the mobile communication network for explaining a path setting control assuming a mobile packet terminal being roamed in the dormant state across radio zones.

Next, referring to FIG. 6, in order to perform radio packet communications as mentioned earlier, the mobile communication network 13 comprises internally a plurality of base stations 16, a plurality of mobile network exchanges 15, and the radio terminators 12a and 12b. The base station 16 transmits/receives radio packets to/from the mobile packet terminal 11 via radio waves or radio links. A mobile network exchange 28 performs call control, roaming management, and radio management in order to perform mobile communications. The radio terminators 12a and 12b terminate the radio section protocol and control connection with the external communication network 14 when the radio packet communication is performed.

Here, referring to FIG. 2 and FIG. 5, as described above, when the mobile packet terminal 11 roams in the active state from the radio zone 17 to the radio zone 18, the packet communication state management device 21 for the radio terminator 12a recognizes that the packet communication state is the active state and sends a control signal to the mobile network exchange 15 in the home zone requesting the exchange to route a path to connect the current radio terminator 12a to the next zone or radio zone 18, when the mobile packet terminal 11 roams in the active state across radio zones. Such a control method is referred to as the anchor method.

Next, referring to FIG. 5 and FIG. 6, when the mobile packet terminal 11 roams in the dormant state from the radio zone 17 to the radio zone 18, the packet communication state management device 21 for the radio terminator 12a recognizes that the packet communication state is the dormant state and sends a control signal to the mobile network exchange 15 in the home zone requesting the exchange to disconnect the current path, when the mobile packet terminal 11 roams in the dormant state across radio zones. Further, the packet communication state management device 21 sends a control signal to the mobile network exchange 15 in the next zone or radio zone 18 requesting the exchange to connect the mobile packet terminal 11 and the radio terminator 12b. Such a control method is refereed to as the drift method.

Figure 7:
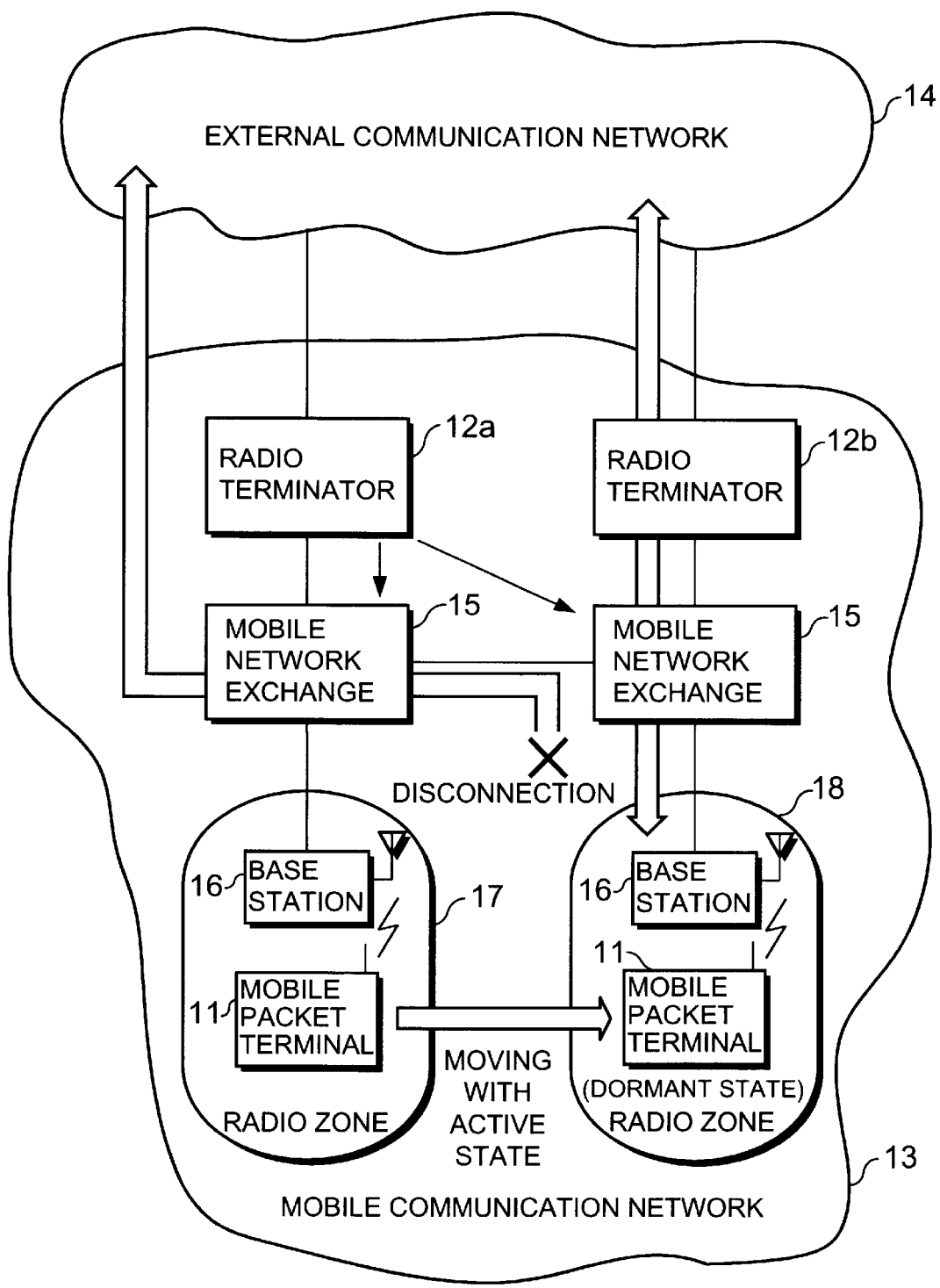
FIG. 7 shows a block diagram of the mobile communication network for explaining a path setting control assuming a mobile packet terminal being roamed in the active state across radio zones and changed into the dormant state.
Figure 8:
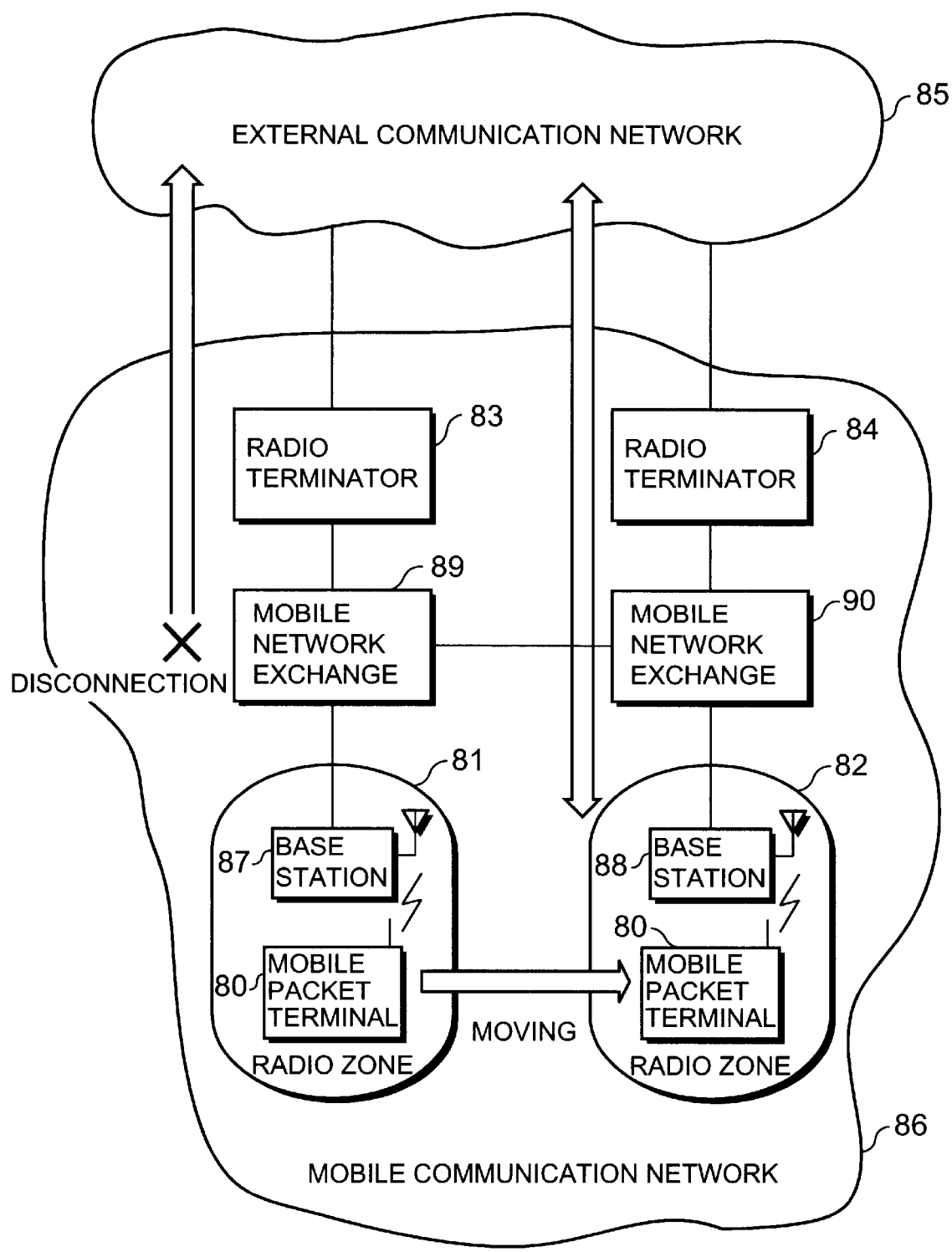
FIG. 8 shows a block diagram of the mobile communication network for explaining a path setting control in the conventional method.

Further, referring to FIG. 5 and FIG. 7, the following explains a case where the packet communication state is the active state and the mobile packet terminal 11 has roamed across radio zones, then it has made transition to the dormant state.

When the mobile packet terminal 11 roams in the active state across radio zones, the packet communication state management device 21 for the radio terminator 12a recognizes that the packet communication state is the active state and sends a control signal to the mobile network exchange 15 in the home zone requesting the exchange to route a path to connect the current radio terminator 12a to the next zone or radio zone 18, when the mobile packet terminal 11 roams in the active state across radio zones. After that, when the radio terminator 12a recognizes that the packet communication state is the dormant state, it sends a control signal to the mobile network exchange 15 in the home zone requesting the exchange to disconnect the current path. Further, the radio terminator 12a sends a control signal to the mobile network exchange 15 in the next zone requesting the exchange to connect the mobile packet terminal 11 and the radio terminator 12b.

Although, in the above examples, the radio terminator judges the packet communication state to control path setting when the mobile packet terminal roams across radio zones, an alternative may be implemented that the packet communication state is not judged before and after the time when the mobile packet terminal roams across radio zones but the radio terminator sets a path according to the pattern shown in FIG. 2, and supervises the packet communication state of the radio zone after the mobile packet terminal has left the zone, and when the packet communication is in the dormant state or enters the dormant state, a path is switched to the radio terminator in the home zone, as shown in FIGS. 3 and 4.

In such a way, path setting control by the packet communication state can be simplified so that transmission of control signals between mobile network exchanges is simplified, and control is further improved when the mobile packet terminal has changed from dormant state to active state while it is roaming.

Although, in the above examples, the mobile network exchange and the radio terminator are separate, an alternative may be implemented that the mobile network exchange includes the radio terminator.

As explained hereabove, in the present invention, when the packet communication state is the active state, a path is routed to the next zone without the radio terminator being changed irrespective of roaming of a mobile packet terminal across radio zones, that is, the anchor method is employed for path setting. This provides an advantage that packet communications are stabilized. Additionally, in the present invention, when the packet communication state enters the dormant state after path routing, the radio terminator in the previous radio zone is disconnected and a path is connected to the radio terminator in the home zone without delay. This provides an advantage that unnecessary path routing can be avoided.

What is claimed is:

1. A path setting method in mobile packet communications wherein at least one mobile packet terminal is provided, and a plurality of radio zones are specified, and repeater sections corresponding to said radio zones are provided for connecting an external communication network and said radio zones, and each of said repeater sections comprises base stations for performing packet communications by using said mobile packet terminals and radio links, mobile network exchanges connected to said base stations, and radio terminators connected to said mobile network exchange and which terminate a radio section protocol to connect to said external communication network, and when said mobile packet terminal roams in a dormant state from the first radio zone to the second radio zone, said method comprising:

instructing, by the radio terminator corresponding to said first radio zone, the mobile network exchange in said first radio zone to disconnect the path connecting the mobile network exchange in said first radio zone and the base station in said first radio zone; and instructing, by the radio terminator corresponding to said first radio zone, the mobile network exchange in the second radio zone to set a path across said mobile packet terminal and the radio terminator corresponding to said second radio zone.

2. A path setting method in mobile packet communications wherein at least one mobile packet terminal is provided, and a plurality of radio zones are specified, and repeater sections corresponding to said radio zones are provided for connecting an external communication network and said radio zones, and each of said repeater sections comprises base stations for performing packet communications by using said mobile packet terminals and radio links, mobile network exchanges connected to said base stations, and radio terminators connected to said mobile network exchange and which terminate a radio section protocol to connect to said external communication network, and when said mobile packet terminal roams in the active state from the first radio zone to the second radio zone and the state is changed into the dormant state, said method comprising:

instructing, by the radio terminator corresponding to said first radio zone which has recognized said active state, the mobile network exchange in said first radio zone to set a path across the mobile network exchange in said first radio zone and the mobile network exchange in said second radio zone, and to establish a path connection across said mobile packet terminal and the radio terminator corresponding to said first radio zone; and instructing, by the radio terminator corresponding to said first radio zone which has recognized said dormant state, the mobile network exchange in said first radio zone to disconnect the path connecting the mobile network exchange in said first radio zone and the base station in said first radio zone, and instructing the mobile network exchange in the second radio zone to set a path across said mobile packet terminal and the radio terminator corresponding to said second radio zone.

3. A path setting method in mobile packet communications wherein at least one mobile packet terminal is provided, and a plurality of radio zones are specified, and repeater sections corresponding to said radio zones are provided for connecting an external communication network and said radio zones, and each of said repeater sections comprises base stations for performing packet communications by using said mobile packet terminals and radio links, mobile network exchanges connected to said base stations, and radio terminators connected to said mobile network exchange and which terminate a radio section protocol to connect to said external communication network, and when said mobile packet terminal roams from the first radio zone to the second radio zone, said method comprising:

instructing, by the radio terminator corresponding to said first radio zone, the mobile network exchange in said first radio zone to set a path across the mobile network exchange in said first radio zone and the mobile network exchange in said second radio zone and to establish a path connection across said mobile packet terminal and the radio terminator corresponding to said first radio zone;

supervising, by said radio terminator corresponding to said first radio zone, packet communication state of said mobile packet terminal to judge whether the packet communication state of said mobile packet terminal is the dormant state; and instructing, by said radio terminator corresponding to said first radio zone if the dormant state of said mobile packet terminal is detected, the mobile network exchange in said first radio zone to disconnect the path connecting the mobile network exchange in said first radio zone and the base station in said first radio zone, and instructing the mobile network exchange in the second radio zone to set a path across said mobile packet terminal and the radio terminator corresponding to said second radio zone.

* * * * *